US012803427B2

(12) United States Patent
Xue

(10) Patent No.: US 12,803,427 B2
(45) Date of Patent: Nov. 17, 2026

(54) ENERGY-SAVING AND PARALLEL SUPERPOSITION WIRING METHOD FOR THREE-PHASE CURRENT-SOURCE-RECTIFIER RECTIFICATION CIRCUIT

(71) Applicant: Luoliang Xue, Zhengzhou (CN)

(72) Inventor: Luoliang Xue, Zhengzhou (CN)

(*) Notice: Subject to any disclaimer, the term of this patent is extended or adjusted under 35 U.S.C. 154(b) by 157 days.

(21) Appl. No.: 18/983,439

(22) Filed: Dec. 17, 2024

(65) Prior Publication Data

US 2025/0119057 A1 Apr. 10, 2025

Related U.S. Application Data

(63) Continuation of application No. PCT/CN2022/110803, filed on Aug. 8, 2022.

(51) Int. Cl.
*H02M 1/42* (2007.01)
*H02M 1/12* (2006.01)
(Continued)

(52) U.S. Cl.
CPC ......... *H02M 1/4266* (2013.01); *H02M 1/126* (2013.01); *H02M 1/4216* (2013.01);
(Continued)

(58) Field of Classification Search
CPC .... H02M 1/4266; H02M 1/126; H02M 7/219; H02M 7/068; H02M 7/08; H02M 1/0048;
(Continued)

(56) References Cited

U.S. PATENT DOCUMENTS

| | | | |
|---|---|---|---|
| 9,973,107 B2 * | 5/2018 | Cerqueira Pinto Bezerra Varajão et al. | H02M 5/297 |
| 10,574,136 B2 * | 2/2020 | Giuntini | H02M 1/4216 |

FOREIGN PATENT DOCUMENTS

| | | | |
|---|---|---|---|
| CN | 207173336 U | * | 4/2018 |
| CN | 207559874 U | * | 6/2018 |

(Continued)

*Primary Examiner* — Crystal L Hammond
*Assistant Examiner* — Nicolas Alden Chapa Mills
(74) *Attorney, Agent, or Firm* — WPAT, PC

(57) ABSTRACT

An energy-saving and parallel superposition wiring method for a three-phase current-source-rectifier (CSR) rectification circuit, includes: providing two windings on a secondary side of a distribution transformer for power supply; supplying power to two sets of CSR half-bridge circuits, respectively; and voltages on the two windings are equal, and corresponding phases of the two windings are the same. Connecting the two sets of CSR half-bridge circuits to the two windings, respectively; the two sets of CSR half-bridge circuits operating in respective operation times, and each of the operation times being corresponding to an angle interval of 60°, thereby forming an alternating operation mode and the operation times being complementary, to complete a full-bridge CSR high-frequency rectification function. The energy-saving and parallel superposition wiring method is provided that decreases the number of switching transistors, reduces power consumption, improves a withstand voltage and a power factor, reduces harmonics, and increases power.

3 Claims, 2 Drawing Sheets

(51) Int. Cl.
*H02M 7/219* (2006.01)
*H02M 7/23* (2006.01)

(52) U.S. Cl.
CPC ......... *H02M 7/219* (2013.01); *H02M 7/2195* (2021.05); *H02M 7/23* (2013.01)

(58) Field of Classification Search
CPC ............. H02M 7/2195; H02M 1/4216; H02M 1/0085; H02M 7/217–23
See application file for complete search history.

(56) References Cited

FOREIGN PATENT DOCUMENTS

| | | | | | |
|---|---|---|---|---|---|
| CN | 110504850 B | * | 11/2020 | .......... | H02M 7/2173 |
| CN | 114582622 A | * | 6/2022 | ........ | H02M 3/33592 |

* cited by examiner

ENERGY-SAVING AND PARALLEL SUPERPOSITION WIRING METHOD FOR THREE-PHASE CURRENT-SOURCE-RECTIFIER RECTIFICATION CIRCUIT

CROSS-REFERENCE TO RELATED APPLICATION

This application is a continuation of International Patent Application No. PCT/CN2022/110803, filed on Aug. 8, 2022, which is herein incorporated by reference in its entirety.

TECHNICAL FIELD

The disclosure is related to the technical field of current-source-rectifier (CSR) rectification circuits, and more particularly to an energy-saving and parallel superposition wiring method for a three-phase CSR rectification circuit.

BACKGROUND

CSR rectification circuit is a high-frequency pulse width modulation (PWM) current source buck rectifier power circuit, and a high-power rectification circuit uses a three-phase input power, as shown in FIG. 1, it illustrates a topology diagram of an existing three-phase six-switch CSR rectification circuit used in the related art.

The existing CSR rectification circuit in the related art is characterized by a large power factor of power factor correction (PFC) function and a high precision of output power control; a high-frequency operation of the existing CSR rectification circuit in the related art is realized through high-power switching transistors, therefore, the operating frequency of the CSR rectification circuit is high, and harmonics generated are small.

An on-off control of the switching transistors of the existing CSR rectification circuit in the related is completed by a control circuit. According to a need of a load size, the control circuit adjusts a conduction pulse width, which is PWM, to achieve the on-off control. The pulse width is determined by modulating a triangular wave carrier with a sinusoidal wave, because the power supply is the sinusoidal wave. In order to improve a power factor, the sinusoidal wave is used as a modulation wave, which makes a current magnitude and a voltage magnitude change synchronously. This is also known as a sinusoidal pulse width modulation (SPWM) high-frequency rectification power, where “S” stands for the sinusoidal wave, and the following SPWM is represented by PWM.

Nowadays, a high-power rectifier is controlled using a dedicated Digital Signal Processor (DSP) controller, which operates on a same principle as a triangular wave modulation. Losses of the rectification circuit mainly includes switching process losses and saturation conduction losses of the switching transistors; therefore, a main task of the disclosure is to reduce the number of operating switching transistors is a main task of the disclosure.

In addition, in many occasions, the CSR rectification circuit needs to operate under a high-voltage and high-current condition. According to the current manufacturing technology of transistor, a speed of a high-withstand-voltage and high-current switching transistor cannot be too fast. In order to improve the power factor, reduce harmonics caused by the CSR rectification circuit, and increase power, an operating frequency of the CSR rectification circuit must be greater than 20 kilohertz (kHz). Consequently, multiple CSR rectification circuits are needed to operate in a parallel superposition manner.

SUMMARY

In view of this, the disclosure provides an energy-saving and parallel superposition wiring method for a three-phase CSR rectification circuit that decreases the number of switching transistors, reduces power consumption, improves a withstand voltage and a power factor, reduces harmonics, and increases power.

In order to achieve the purpose of the disclosure, the following technical solutions can be adopted.

An energy-saving and parallel superposition wiring method for a three-phase CSR rectification circuit, includes: providing two windings on a secondary side of a distribution transformer for power supply; and supplying power to two sets of CSR half-bridge circuits (also referred to as two sets of CSR non-full-bridge circuits) by the two windings, respectively. Moreover, voltages on the two windings are equal, and corresponding phases of the two windings are the same.

In some embodiments, the energy-saving and parallel superposition wiring method includes: connecting/loading the two sets of CSR half-bridge circuits to the two windings, respectively; and the two sets of CSR half-bridge circuits operating/working in respective operation times, and each of the operation times being corresponding to an angle interval of 60°, thereby forming an alternating operation mode and the operation times being complementary, to complete a full-bridge CSR high-frequency rectification function.

In some embodiments, the energy-saving and parallel superposition wiring method includes: superposing all CSR half-bridge circuits of each of the two sets of CSR half-bridge circuits in parallel. In other words, each of the two sets of CSR half-bridge circuits has two or more than two CSR half-bridge circuits, and the two or more than two CSR half-bridge circuits all are superposed in parallel.

The beneficial effect of the disclosure is: the energy-saving and parallel superposition wiring method of the disclosure aims to reduce loop losses by reducing the number of working switching transistors in a CSR rectification circuit; an exemplary implementation method is to provide the two windings on a low-voltage side (also referred as to secondary side) of the distribution transformer for power supply. The two windings have equal voltages and are electrically disconnected, and the two windings are loaded with two sets of CSR non-full-bridge circuits (also referred to as two sets of CSR half-bridge circuits), respectively. The two sets of CSR non-full-bridge circuits operate in their respective operating times, and each operating time corresponds to an angle of 60°, thereby forming the alternating mode and the operating times being complementary. As observed from the input on a primary side of the distribution transformer, a current sinusoidal wave is not deformed, thus achieving an excellent “full-bridge” CSR high-frequency rectification function. In addition, the low-voltage side of the distribution transformer is provided with the two windings, and the two windings are loaded with the two sets of CSR half-bridge circuits respectively, and half-bridges of upper and lower sets of CSR half-bridges circuits each are connected with one energy storage inductor. Operations of circuits have a symmetry, and thus the circuits can be well superposed in parallel, thereby achieving an effect of increasing output power.

DETAILED DESCRIPTION OF EMBODIMENTS

The disclosure will be described in further detail with reference to the accompanying drawings and embodiments.

The disclosure provides an energy-saving and parallel superposition wiring method for a three-phase CSR rectification circuit.

Figure 1:
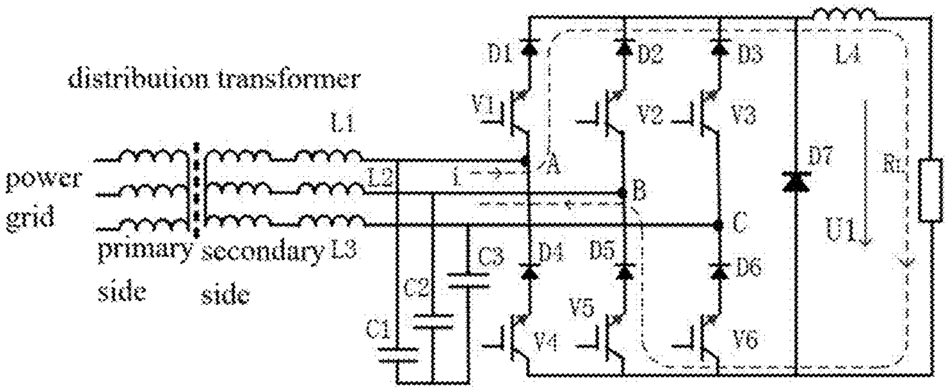
FIG. 1 (Related Art)
FIG. 1 illustrates a topology diagram of a three-phase CSR rectification circuit in the related art.

Referring to FIG. 1, a characteristic of an existing three-phase CSR rectification circuit in the related art is that commutation occurs between switching transistors of an upper bridge arm and a lower bridge arm of adjacent phases. FIG. 1 illustrates a topology diagram of the CSR rectification circuit in the related art. V1, V2, V3 are switching transistors of upper bridge arms of three phases A, B, C respectively, and D1, D2, D3 are diodes of the upper bridge arms of the three phases A, B, C respectively. V4, V5, V6 are switching transistors of lower bridge arms of the three phases A, B, C respectively, and D4, D5, D6 are diodes of the lower bridge arms of the three phases A, B, C respectively. L4 is an energy storage inductor, and D7 is a freewheeling diode.

A power supply source of the existing three-phase CSR rectification circuit in the related art is provided by one winding of a distribution transformer. At any moment during an operation of the CSR rectification circuit, only one of the three switching transistors of the upper bridge arms and only one of the three switching transistors of the lower bridge arms are turned-on to thereby form an inter-phase rectification closed loop. For example, when the switching transistor V1 of the upper bridge arm is turned-on, one of the switching transistors V5 and V6 of the lower bridge arms is turned-on, to form a current path. Actions of other switching transistors proceed in a similar manner.

Figure 2:
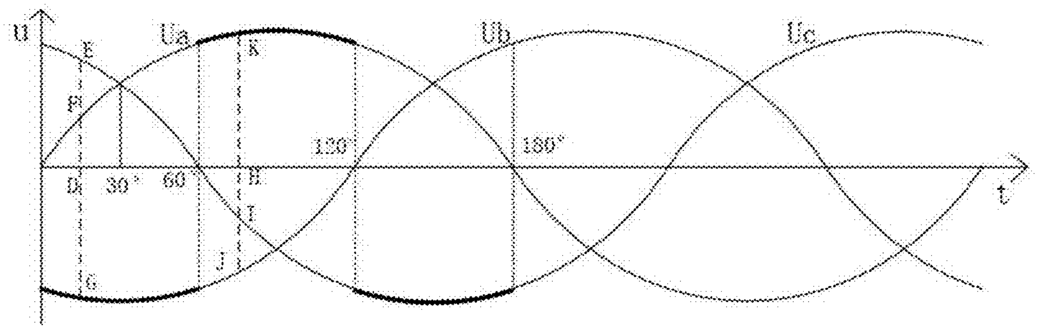
FIG. 2 illustrates a waveform diagram for a three-phase CSR rectification circuit associated with an energy-saving and parallel superposition wiring method for the three-phase CSR rectification circuit according to an embodiment of the disclosure.

Referring to FIG. 2, FIG. 2 illustrates a waveform diagram of sinusoidal waves of three phases of a three-phase CSR rectification circuit. In FIG. 2, Ua, Ub, Uc respectively represent curves of voltages of three phases A, B, C changing along with time (or angle). On a time axis of FIG. 2, when a point D is arbitrarily selected, voltage values of the three phases A, B and C correspondingly are points F, G and E respectively.

According to an operating/working principle of the three-phase CSR rectification circuit, an operating voltage corresponding to the point D is Uab (the line segment FG represents a magnitude of Uab) or Ubc (the line segment EG represents a magnitude of Ubc). When the operating voltage being Uab is taken as an example, the switching transistors V1 and V5 in FIG. 1 are correspondingly turned-on, current i flows out from the phase A, passes through V1, D1, L4, a load RL, V5 and D5, and then flows back to the phase B, as per a dashed line shown in FIG. 1. In this operation process, main components that cause losses in the CSR rectification circuit are V1, D1, V5, and D5, i.e., two switching transistors and two diodes. Similarly, it can be found that, in each conduction/operation process, losses caused by two switching transistors and two diodes are always generated, and the losses of the switching transistors are much greater than the losses of the diodes. Therefore, a main task/purpose of the disclosure is to reduce the number/quantity of the switching transistors.

The disclosure aims to reduce circuit losses by reducing the number of the switching transistors of the existing three-phase CSR rectification circuit in the related art.

An exemplary implementation method is to provide two windings on a low-voltage side (also referred as to secondary side) of a distribution transformer for power supply. The two windings have equal voltages and are electrically disconnected, and the two windings are loaded with two sets of CSR non-full-bridge circuits, respectively. The two sets of CSR non-full-bridge circuits operate in their respective operating times, and each of the operating times corresponds to an angle of 60°, thereby forming an alternating mode and the operating times being complementary. As observed from the input on a primary side of the distribution transformer, a current sinusoidal wave is not deformed, thus achieving an excellent “full-bridge” CSR high-frequency rectification function.

Figure 3:
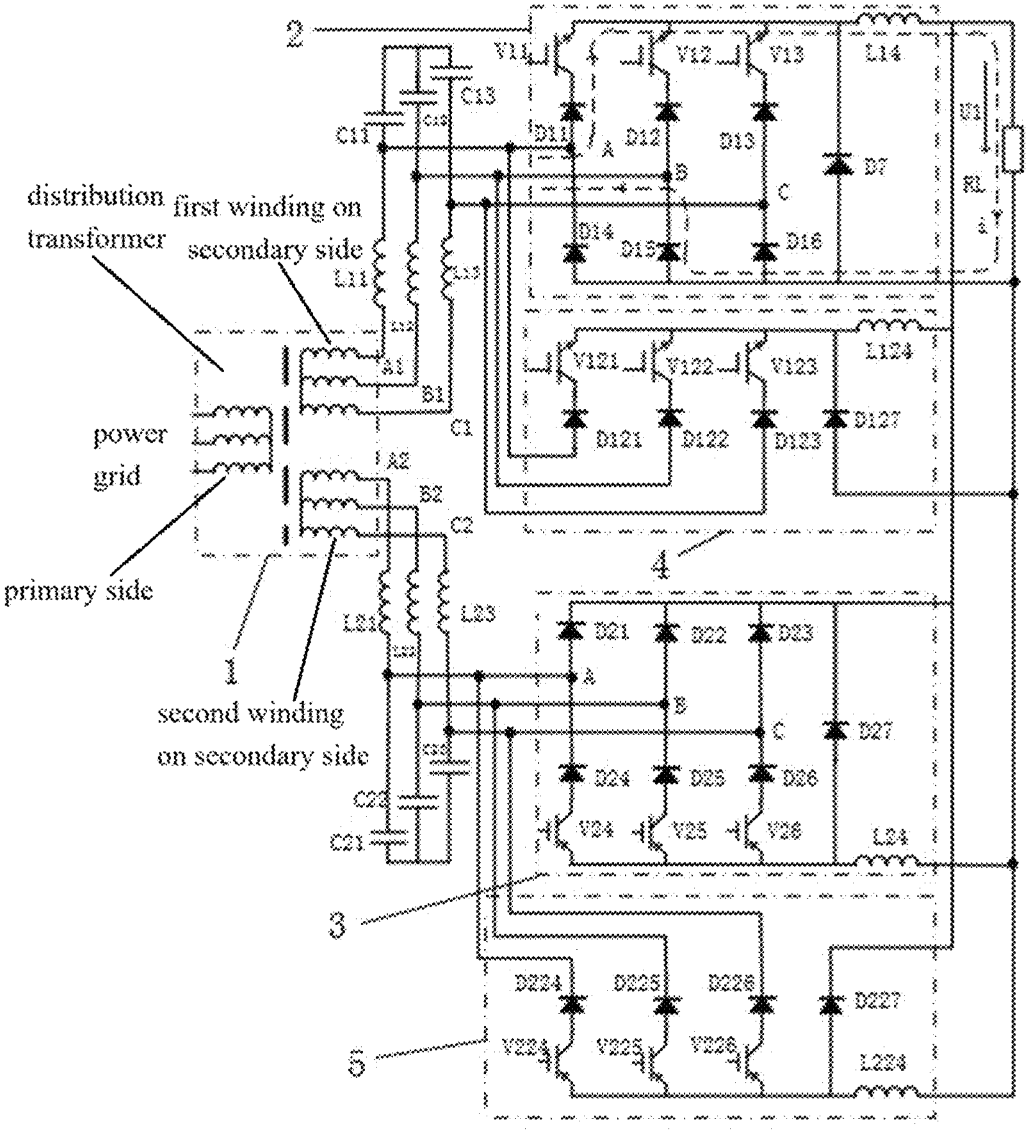
FIG. 3 illustrates a diagram of the three-phase CSR rectification circuit associated with the energy-saving and parallel superposition wiring method for the three-phase CSR rectification circuit according to an embodiment of the disclosure.

Referring to FIG. 3, a distribution transformer 1 is illustrated, a primary side of the distribution transformer 1 is connected to receive a high-voltage of a power grid, and a secondary side of the distribution transformer 1 provides two windings, being a first wingding and a second winding, respectively. Voltages of the two windings are equal, and corresponding phases of the two windings are the same. The two windings are loaded with two sets of CSR half-bridge circuits (also referred to as two sets of CSR non-full-bridge circuits), respectively.

As shown in FIG. 3, the first winding is loaded with a first CSR half-bridge circuit 2, and a combination of the distribution transformer 1 and the first CSR half-bridge circuit 2 is called as an upper half region/area. The second winding is loaded with a second CSR half-bridge circuit 3, and a combination of the distribution transformer 1 and the second CSR half-bridge circuit 3 is called as a lower half area.

In the disclosure, each the CSR half-bridge circuit 2, 3 is different from an existing CSR full-bridge circuit, the existing CSR full-bridge circuit is shown as FIG. 1, which shows three symmetrical switching transistors and diodes of the upper bridge arms and the lower bridge arms.

The CSR half-bridge circuits of the disclosure are shown in FIG. 3, and the first CSR half-bridge circuit 2 of the upper half area is indicated by a dashed box 2.

The first CSR half-bridge circuit 2 removes/eliminates the three switching transistors of the lower bridge arms of the existing CSR rectification circuit in the related art. The first CSR half-bridge circuit 2 of the upper half area includes an upper half bridge and a lower half bridge, the upper half bridge includes switching transistors V11, V12, V13 and diodes D11, D12, D13, and the lower half bridge includes diodes D14, D15, D16.

As shown in FIG. 3, the second CSR half-bridge circuit 3 removes/eliminates the three switching transistors of the upper bridge arms of the existing CSR rectification circuit in the related art. The second CSR half-bridge circuit 3 includes an upper half bridge and a lower half bridge, the upper half bridge includes diodes D21, D22, D23, and the lower half bridge includes switching transistors V24, V25, V26 and diodes D24, D25, D26.

Angles corresponding to operating times of the upper half area and the lower half area are strictly defined. Ranges of the operating times of the upper half area are 0°-60°, 120°-180°, 240°-300°, etc.; and ranges of the operating times of the lower half area are 60°-120°, 180°-240°, 300°-360°, etc.

A concrete operating process will be described in combination with FIG. 2 and FIG. 3. In FIG. 2, when a voltage operation interval is 0°-60°, the CSR half-bridge circuit 2 of the upper half area loaded/driven by the first winding of the distribution transformer 1 is operating, while the switching transistors of the CSR half-bridge circuit 3 of the lower half area loaded/driven by the second winding of the distribution transformer 1 are all turned-off, and thus the lower half area does not operate at this time, V24, V25, V26 (also including V224, V225, V226) are all turned-off. In FIG. 2, the point D is arbitrarily selected, an operating voltage of the CSR half-bridge circuit at this time is Uab or Ubc. Assuming the operating voltage is Uab, an operation process is that V11 is turned-on, current flows from the phase A and passes through D11, V11, L14, a load RL and D15, and then flows back to the phase B. As shown in FIG. 3, it illustrates a flowing direction of the current i in the CSR half-bridge circuit 2 of the upper half area. At the point D, corresponding voltage values of the three phases A, B and C are the points F, G and E, respectively, and it can be found that the voltage value of the phase B is the lowest one in the interval of 0°-60°. Although the lower bridge arms have the three diodes D14, D15, D16 of the three phases, the current can only flow back to the phase B with the lowest voltage value. Therefore, the current of the phase A can only flow back through the diode D15 of the phase B, and cannot flow back to the phase C. In the operation process of Uab, main components that cause losses in the CSR half-bridge circuit are D11, V11 and D15, i.e., one switching transistor and two diodes. Compared with the CSR operation in the related art, loss of one switching transistor is reduced in this operation process.

Similarly, assuming the operating voltage corresponding to the point D is Ubc, at this time, V13 is turned-on, current flows from the phase C, passes through D13, V13, L14, the load RL and D15, and then flows back to the phase B. Since the voltage value of the phase B is the lowest one in the interval of 0°-60°, the current flows from the phase C can only flow back through the diode D15 of the phase B, and cannot flow back to the phase A.

Therefore, in the operation process of Ubc, main components that causes the losses in the CSR half-bridge circuit are D13, V13 and D15, i.e., one switching transistor and two diodes. Compared with the CSR operation in the related art, loss of one switching transistor is reduced in this operation process.

As shown in FIG. 2, when the voltage operation interval is 60°-120°, the second CSR half-bridge circuit 3 of the lower half area loaded/driven by the second winding of the distribution transformer 1 is operating, while the switching transistors of the CSR half-bridge circuit 2 of the upper half area loaded/driven by the first winding of the distribution transformer 1 are all turned-off, that is, V11, V12 and V13 (also including V121, V122 and V123) are all turned-off, and thus the upper half area does not operate at this time.

In FIG. 2, a point H is arbitrarily selected, and at this time points corresponding to voltage values of three phases are K, J and I respectively. Although the upper bridge arms of the three phases have three diodes D21, D22, D23, it can be found that the voltage value of the phase A is the highest one in the interval of 60°-120°, and therefore the current can only flow out from the diode D21 of the phase A, and cannot flow out from the diode D22 of the phase B and the diode D23 of the phase C. The CSR half-bridge circuit is characterized in that the operating voltage at this time only is Uab or Uac. When the operation voltage being Uab is taken as an example, V25 is turned-on, current flows back to the phase B after passing through V25, that is, the current flows through the components D21, the load RL, L24, V25 and D25, and then back to the phase B. In the operation process associated with the operation voltage Uab, main components that cause losses in the CSR half-bridge circuit are D21, V25 and D25, i.e., one switching transistor and two diodes. Compared with the CSR operation in the related art, loss of one switching transistor is reduced in this operation process. Similarly, loss during the voltage of Uac is operating is the same.

For the same reason, since the voltage value of the phase C is the lowest one in the interval of 120°-180°, the CSR half-bridge circuit is characterized in that only the operation voltage of Uac or Ubc at this time is operating, current of the phase A or B can only flow back to the phase C. Similarly, through analyzing the operation voltages Uac and Ubc, it can be found that components that cause losses in the CSR half-bridge circuit during the operation process of Uab or Ubc are one switching transistor and two diodes.

The half-bridge circuit of the upper half area and the half-bridge circuit of the lower half area are switched every 60°, and a control method thereof is carried out as per the above principle, to thereby complete a CSR symmetrical rectification operation successfully. The existing CSR full-bridge circuit in the related art have losses of two switching transistors and two diodes, but each the CSR half-bridge circuit of the disclosure reduces the loss of one switching transistor.

The loss of one switching transistor includes two parts, one is a switching process loss, and the other is a saturation conduction voltage drop loss. The saturation conduction voltage drop loss is approximately 3 volts (V). If there is a current of 50 amperes (A) in a loop, the saturation conduction voltage drop loss of the switching transistor is 150 watts (W), and the switching process loss is more than three times of the saturation conduction voltage drop loss. A diode voltage drop is less than 1 V, and a diode loss is less than 50 W when the current is 50 A in the loop. Therefore, each the CSR half-bridge circuit of the disclosure reduces one switching transistor, which is equivalent to reducing the loop loss of more than 30%.

According to a current manufacturing process of transistor, an operation frequency of a high-voltage and high-power switching transistor cannot be too high, in order to improve a power factor, reduce harmonics, and increase a power output in the three-phase CSR rectification circuit, multiple CSR rectification circuits are needed to operate in a parallel superposition manner.

A bridge end output loop of the existing CSR full-bridge rectification circuit in the related art can only have one energy storage inductor, such as L4 in FIG. 1, which makes the output circuit be asymmetric, so that in FIG. 2, voltages operating in an upper half-cycle of the sinusoidal wave can be superposed in parallel, while voltage operating in a lower half-cycle of the sinusoidal wave cannot be superposed in parallel, which prevents multiple (i.e., more than one) CSR rectification circuits from being superposed in parallel.

In the disclosure, since the low-voltage side (also referred to as secondary side) of the distribution transformer 1 provides two windings, the two windings have equal voltages and are electrically disconnected, and the two windings are loaded with two sets of CSR half-bridge circuits respectively, to thereby form an upper half area and a lower half area. Half-bridge circuits of the upper half area and the lower half area each are connected with one energy storage inductor, which makes operations of the upper half-cycle and lower half-cycle of the voltage sinusoidal wave be balanced, and a fully symmetrical CSR rectification operation is completed by a combination of the two half areas (i.e., the upper half area and the lower half area).

As shown in FIG. 3, two half-bridge circuits of the upper half area are connected with the inductor L14 and an inductor L124, respectively; and two half-bridge circuits of the lower half area are connected with the inductor L24 and an inductor L224, respectively. As such, operations of the circuits have a symmetry, and thus the circuits can be well superposed in parallel.

As shown in FIG. 3, the first CSR half-bridge circuit 2 in the upper half area is superposed with a first parallel superposition circuit 4 in parallel, and the first parallel superposition circuit 4 is the second CSR half-bridge circuit in the upper half area. Specifically, the first parallel superposition circuit 4 includes switching transistors V121, V122, V123 and diodes D121, D122, D123; and the inductor L124 serves as an energy storage element of the half-bridge circuit of the first parallel superposition circuit 4. In the first parallel superposition circuit 4, currents of the respective switching transistors flow through the load to do work and then flows back to a power supply end through the respective diodes D14, D15 and D16 in the first CSR half-bridge circuit 2. In addition, as seen from FIG. 3, the first CSR half-bridge circuit 2 and the first parallel superposition circuit 4 (i.e., another CSR half-bridge circuit) have different circuit configurations, for example, the first CSR half-bridge circuit 2 includes half bridges of three phases, and the first parallel superposition circuit 4 includes half bridges of three phases, each of half bridges of three phases of the first CSR half-bridge circuit 2 has one switching transistor and two diodes, each of half bridges of three phases of the first parallel superposition circuit 4 has one switching transistor and one diode, and thus one of the two diodes e.g., D14, D15 or D16 of each of half bridges of three phases of the first CSR half-bridge circuit 2 serves as a common diode.

As shown in FIG. 3, the second CSR half-bridge circuit 3 is superposed with a second parallel superposition circuit 5 in parallel, and the second parallel superposition circuit 5 is the second CSR half-bridge circuit in the lower half area. The second parallel superposition circuit 5 includes switching transistors V224, V225, V226, and diodes D224, D225, D226; and the inductor L224 serves as an energy storage element of the half-bridge circuit of the second parallel superposition circuit 5.

In the second parallel superposition circuit 5, currents of the respective switching transistors flow through the load to do work and then flows back to the power supply end through the respective diodes D21, D22, and D23 in the second CSR half-bridge circuit 3. D14, D15, and D16 are common diodes used for returned currents of the respective CSR half-bridge circuits 2, 4 in the upper half area, and D21, D22, and D23 are common diodes used for output currents of the respective CSR half-bridge circuits 3, 5 in the lower half area. In addition, as seen from FIG. 3, the second CSR half-bridge circuit 3 and the second parallel superposition circuit 5 (i.e., another CSR half-bridge circuit) have different circuit configurations, for example, the second CSR half-bridge circuit 3 includes half bridges of three phases, and the second parallel superposition circuit 5 includes half bridges of three phases, each of half bridges of three phases of the second CSR half-bridge circuit 3 has one switching transistor and two diodes, each of half bridges of three phases of the second parallel superposition circuit 5 has one switching transistor and one diode, and thus one of the two diodes e.g., D21, D22 or D23 of each of half bridges of three phases of the second CSR half-bridge circuit 3 serves as a common diode.

FIG. 3 only illustrates two parallel superposition circuits 4, 5, but an actual circuit can have much more half-bridge circuits for parallel superposition, and a specific parallel superposition number can be determined based on a load requirement. A control phase of each succeeding superposed circuit is phase-shifted relative to the first CSR half-bridge circuit. Assuming N numbers of CSR rectification circuits (i.e., CSR half-bridge circuits) are superposed in parallel in the upper half area or the lower half area, each the CSR rectification circuit employs a carrier triangular wave phase-shift control, and phase-shifted angles of N numbers of triangular waves in a triangular wave period are $$\frac{2\pi}{N}.$$

The N numbers of CSR rectification circuits are all modulated by a same sinusoidal wave. The parallel superposition control technology is based on a principle may be the same as that of the parallel superposition technology of existing mature voltage-source-rectifier (VSR) rectification circuit, and thus will not be repeated herein.

The disclosure aims to reduce the loop losses by reducing the number of switching transistors in the three-phase CSR rectification circuit. The implementation method exemplarily is to provide two windings on the low-voltage side of the distribution transformer 1 for power supply. The two windings have equal voltages and are electrically disconnected, and the two wingdings are loaded with two sets of CSR non-full-bridge circuits, respectively, to thereby form two sets of CSR non-full-bridge circuits, i.e., an upper set of non-full-bridge circuit and a lower set of non-full bridge circuit. The two sets of CSR non-full-bridge circuits refer to reducing three switching transistors on the upper bridge arms of one of the two circuits and reducing three switching transistors on the lower bridge arms of the other of the two circuits. The two sets of CSR non-full-bridge circuits operate in their respective operating times, and each of the operating times corresponds to an angle interval of 60°, thereby forming an alternating mode and the operating times being complementary, which makes the current be a sinusoidal wave and without deformation, thus completing a full-bridge CSR high-frequency rectification function. In FIG. 3, the dashed box 2 and the dashed box 3 respectively denote two CSR half-bridge circuits, i.e., an upper CSR half-bridge circuit and a lower CSR half-bridge circuit. Compared with the CSR full-bridge circuit in the related art, the two half-bridge circuits in operation each reduce one switching transistor of each half bridge, thereby reducing the circuit loss. In addition, the low-voltage side of the distribution transformer is provided with two windings, and the two windings are loaded with two sets of CSR half-bridge circuits respectively, and half-bridges of the upper and lower sets of CSR half-bridge circuits each are connected with one energy storage inductor. Operations of circuits have a symmetry, and thus the circuits can be well superposed in parallel, thereby achieving an effect of increasing output power.

What is claimed is:

1. An energy-saving and parallel superposition wiring method for a three-phase current-source-rectifier (CSR) rectification circuit, comprising:

providing two windings on a secondary side of a distribution transformer for power supply; and supplying power to two sets of CSR half-bridge circuits by the two windings, respectively; wherein voltages on the two windings are equal, and corresponding phases of the two windings are the same.

2. The energy-saving and parallel superposition wiring method for the three-phase CSR rectification circuit as claimed in claim 1, comprising:

connecting the two sets of CSR half-bridge circuits to the two windings, respectively; and the two sets of CSR half-bridge circuits operating in respective operation times, and each of the operation times being corresponding to an angle interval of 60°, thereby forming an alternating operation mode and the operation times being complementary, to complete a full-bridge CSR high-frequency rectification function.

3. The energy-saving and parallel superposition wiring method for the three-phase CSR rectification circuit as claimed in claim 2, comprising:

superposing all CSR half-bridge circuits of each of the two sets of CSR half-bridge circuits in parallel.

* * * * *